W. R. MILLER.
RIM AND TIRE.
APPLICATION FILED JULY 9, 1918.
1,307,872.
Patented June 24, 1919.
2 SHEETS—SHEET 2.
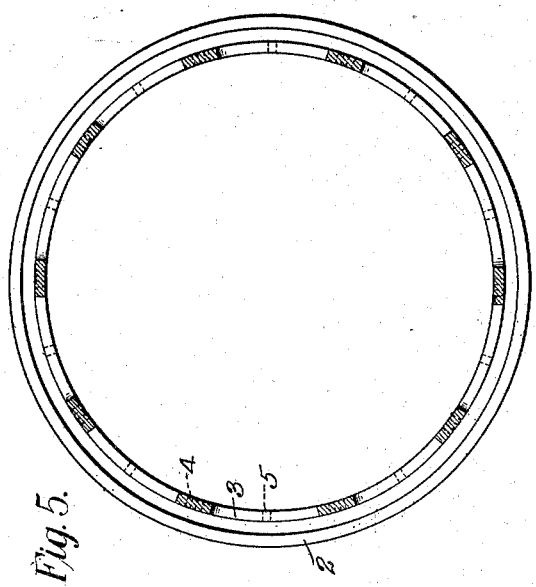
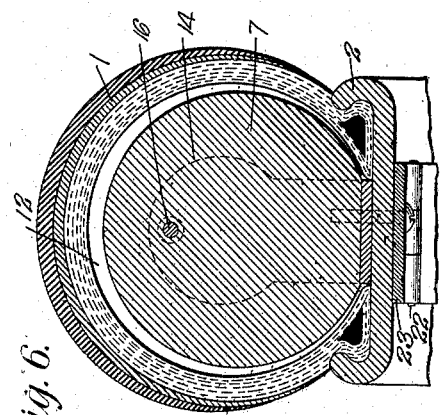
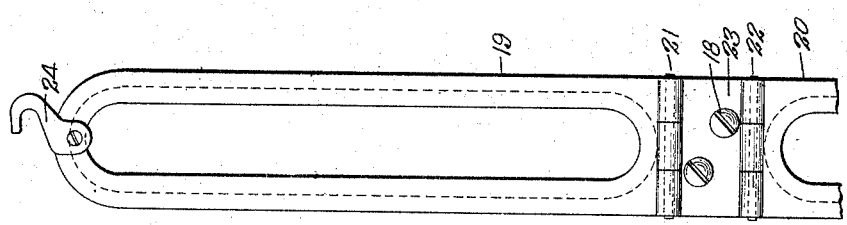
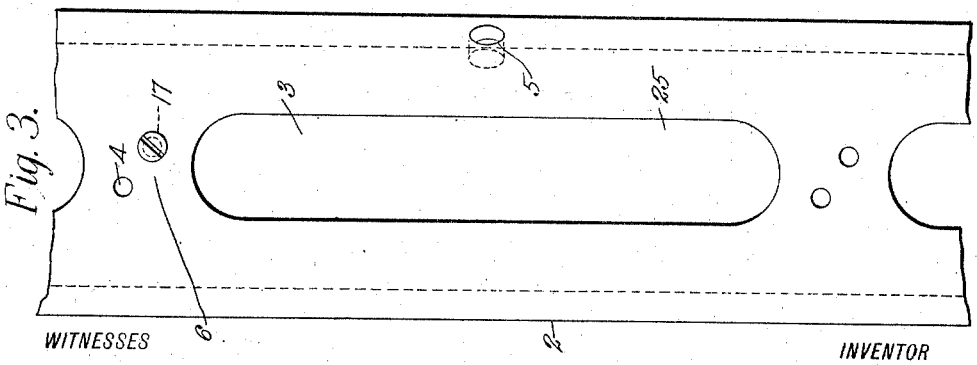
WITNESSES
INVENTOR
William R. Miller
BY
ATTORNEYS

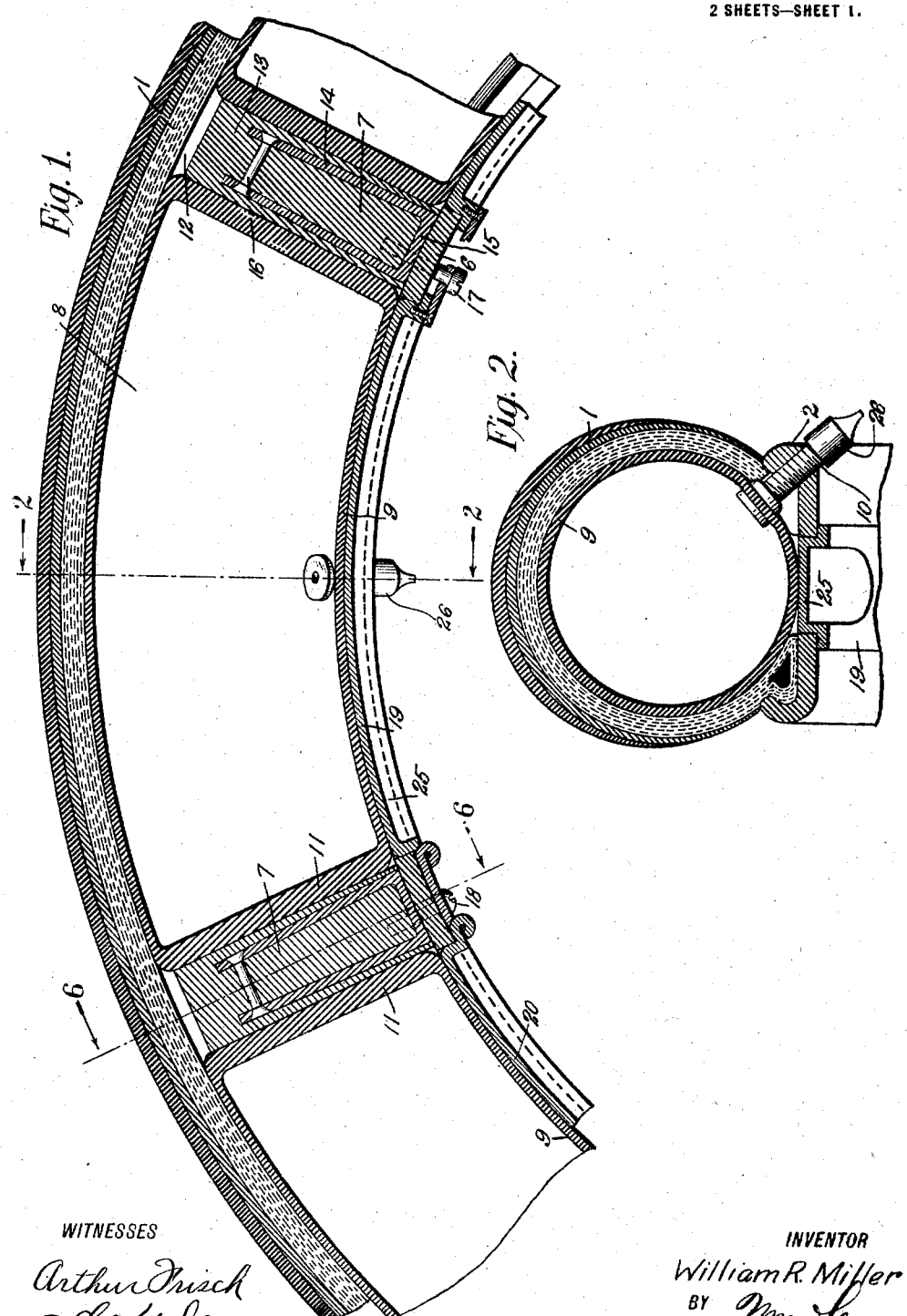

ND OFFICE.

WILLIAM R. MILLER, OF ELIZABETH, NEW JERSEY.

RIM AND TIRE.

1,307,872.     Specification of Letters Patent.     Patented June 24, 1919.

Application filed July 9, 1918. Serial No. 244,090.

*To all whom it may concern:*

Be it known that I, WILLIAM R. MILLER, a citizen of the United States, and a resident of Elizabeth, in the county of Union and State of New Jersey, have invented a new and Improved Rim and Tire, of which the following is a full, clear, and exact description.

This invention relates to vehicle tires and rims and has for an object the provision of an improved construction securing the effect of an ordinary rim and the ordinary pneumatic tire without the disadvantage of the common pneumatic tire now on the market in respect to punctures, blow outs and the like.

Another object in view is to provide a tire structure formed in independent sections with a common casing or shoe so as to produce an even continuous action.

A further object of the invention is the provision of a tire and rim structure wherein the tire is formed in sections and the rim is formed with openings through which the sections may be removed and replaced individually without disturbing the shoe or adjacent section.

Another object of the invention is to provide a tire and rim structure wherein the tire is provided with a plurality of independently inflatable sections and cushioning blocks or sections therebetween positioned to take the weight when any one or more of the inflatable sections have become deflated.

In the accompanying drawings:

Figure 1 is a longitudinal vertical section through part of a tire and rim disclosing an embodiment of the invention.

Fig. 2 is a transverse sectional view through Fig. 1 on line 2—2.

Fig. 3 is an enlarged fragmentary plan view of part of the inner face of a rim embodying certain features of the invention.

Fig. 4 is a view similar to Fig. 3 but showing the covering plate and associate parts.

Fig. 5 is a vertical sectional view through a rim disclosing an embodiment of the invention.

Fig. 6 is a transverse sectional view through Fig. 1 on line 6—6.

Referring to the accompanying drawings by numerals 1 indicates an ordinary shoe of the clencher type adapted to coact with the rim 2, which rim is provided with the usual clencher flanges for receiving the base of a shoe as shown in Fig. 2. The rim 2, however, is specially formed as shown in Figs. 3 and 4, namely with openings 3 and apertures 4 as well as valve stem holes 5. In the drawing ten openings 3 are shown, but it will be evident that a greater or less number may be used as desired. Between these openings a solid section 6 is left in which the apertures 4 are provided. The solid sections 6 are intended to receive the respective cushioning blocks 7, which cushioning blocks are naturally spaced apart according to the length of the openings 3, which lengths are preferably such as to cause the weight to be taken by these blocks and support the vehicle in a similar manner to the way it would be supported approximately if the tire was half deflated, whereby the deflation of any particular section 8 would not materially detract from the smooth running of the tire. It will be understood that there is provided a section 8 for each of the openings 3, each section comprising a rubber tube 9 having its independent valve stem 10 and end walls 11 thick in comparison to the top and bottom walls. This thickness of end walls is intended to assist the cushioning blocks 7 and also prevent any of the tubes 9 crowding into the space 12 between the shoe 1 and the blocks 7. The blocks 7 are made of slightly less diameter than the shoe as shown in Fig. 6, so as to provide the space 12 whereby the resilient effect of the air in the various sections 8 is secured until one or more of the sections have been deflated whereupon the resilient effect of the remaining sections is secured and the cushioning action of the blocks secured. The blocks 7 are each made from a block of rubber 13 having a reinforcing substantially U-shaped metal member 14 embedded therein with the end 15 resting on the section 6 of the rim 2. In order to stiffen the bracing U-member 14 one or more rivets 16 are provided which connect the upper end and which are embedded in rubber. The ends 15 of the reinforcing member 14 are provided with threaded apertures for receiving the screws 17 and 18, which not only lock or clamp the blocks 7 in place, but also clamp the respective covering plates 19 and 20 in place. These covering plates are hinged at 21 and 22 to a base plate 23 through which screws 18 pass. It will thus be seen that the various covering plates for the apertures or openings 3 are arranged in pairs and positioned to swing fully open when it is desired to remove any of the rubber tubes 9 through any of the openings 3. At the ends opposite the hinges 21 and 22 there is a hook member 24 for each of the plates 19 and 20, said hook member coacting with one of the screws 17 which screws are loosened somewhat in order to move the hook members 24 to a disengaged position, after which the covering plates 19 and 20 may be hinged to a full open position. A reverse movement and then the tightening of screw 17 will put the parts again in their proper place.

In order that the tube 9 may have a proper bed to rest on the covering plates 19 are provided with a centrally pressed structure 25 which projects into the openings 3 as shown in Fig. 2 so as to fill the same and make a proper surface for the tube. In case any tube 9 is punctured the particular covering plate 19 or 20 therefor is moved to an open position, cap 26 of the valve 10 is removed and the valve pushed upwardly into the shoe 1. After this has been done the stem 10 and tube 9 are removed through the opening 3 after which a new tube is provided or the old one mended and placed back in position. Where tires are comparatively large, as for instance twelve or fourteen inches in diameter from the base to the periphery, the provision of sections 8 is very desirable as the puncture or blow out of one of the sections will not do the damage that is done by a large tire of the same diameter blowing out wherein the volume of air is so much larger. The blowing out of a large tire when an automobile is running at some speed, especially a front tire is very dangerous as the driver loses control and consequently accidents of a serious nature often happen. The blowing out of a single section 8, whether the section is four inches diameter or fourteen inches or larger would not cause any material damage by reason of the explosion, nor would it throw the car out of control as the cushioning blocks 7 would immediately begin to operate as the supporting means for the shoe.

The rim 2 is of the demountable type and is removed from the wheel before any of the covering plates 19 and 20 are opened and replaced after the repairs have been made. However, in case any one of the sections 8 is punctured the driver may proceed without stopping and ordinarily would not notice the difference. This would not injure any of the tire except possibly the inner tube 9 of the particular section punctured, but as these sections are comparatively small and inexpensive the cutting of one inner tube is not of much importance as the remaining tubes are still in perfect condition and the shoe is in perfect condition.

What I claim is:

1. A combined tire and rim comprising a shoe having an annular interior continuous cavity, a rim for receiving the base of the shoe, a plurality of spaced independently inflatable inner tubes arranged in said shoe, and cushioning blocks connected to said rim arranged between the respective inner tubes, said cushioning blocks being made of a size to extend to a point near the shoe whereby the inner tubes will support the shoe as long as inflated and the cushioning blocks will support the shoe when the inner tubes are deflated.

2. A tire of the character described comprising a shoe having an annular interior continuous cavity, a plurality of independently inflated segmental inner tubes arranged in said shoe, said inner tubes being spaced apart and formed at their ends with comparatively thick walls, and a rubber cushioning member arranged between the thickened walls of adjacent inner tubes.

3. A tire structure comprising a shoe having an annular interior continuous cavity, a rim member having clencher flanges for receiving the base of said shoe, said rim member having a plurality of spaced openings, a pneumatic inner tube section for each opening substantially the same length as said opening and insertible therethrough, an inflating member for each of said tube sections, and means connected rigidly to said rim arranged at each end of the respective sections for supporting the casing when the tube sections are deflated.

4. A tire structure comprising a casing having an annular interior continuous cavity, a rim member formed with means for receiving the base of said casing, a plurality of segmental tube sections arranged in the casing, said tube sections being spaced apart, means for independently inflating each of said sections, and a resilient cushioning member arranged between the various tube sections.

5. A tire structure comprising a shoe having an annular interior continuous cavity, a rim member formed with means for receiving the base of said shoe, a plurality of independently inflatable tube sections arranged in said shoe, said tube sections being spaced apart, a resilient cushion member arranged in the space between each of said sections and contacting with adjacent sections, and means for rigidly clamping said resilient means to said rim member.

6. A tire structure comprising a shoe having an annular interior continuous cavity, a rim member formed with means for receiving the base of said shoe, a plurality of resilient blocks rigidly secured to said rim structure within the shoe, said blocks conforming substantially to the shape of the interior of the shoe but of slightly less diameter, a reinforcing member positioned in each of said blocks for holding same in a radial position and for taking care of excess strains radially and in a direction at right angles to a radial line, and an independent inflatable pneumatic member arranged in said shoe between each pair of blocks.

7. A tire structure comprising a shoe having an annular interior continuous cavity, a rim member formed with means for receiving the base of said shoe, a plurality of inflatable members arranged in said shoe and a reinforced cushioning member between each of said inflatable members said cushioning members contacting with the rim, but normally out of engagement with said shoe.

WILLIAM R. MILLER.

Copies of this patent may be obtained for five cents each, by addressing the "Commissioner of Patents, Washington, D. C."